Dec. 4, 1962 C. A. HERBST 3,066,387
METHOD OF MAKING COMMUTATORS
Filed June 20, 1958 2 Sheets-Sheet 1
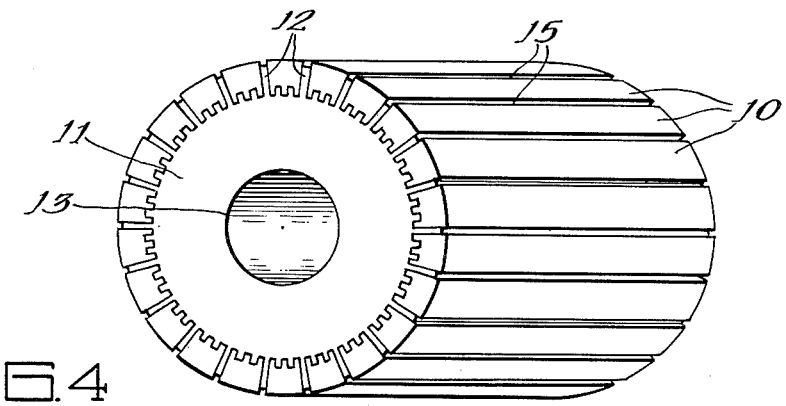
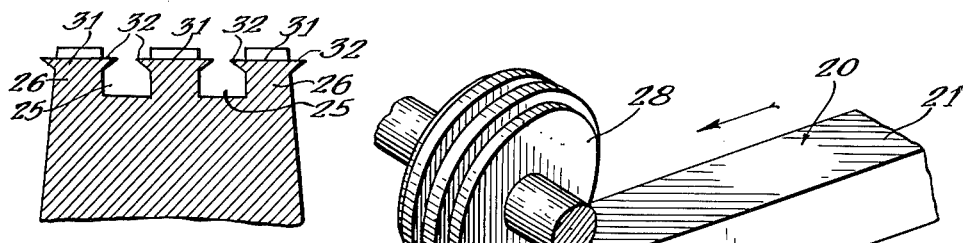
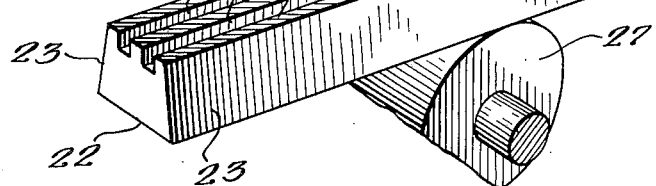
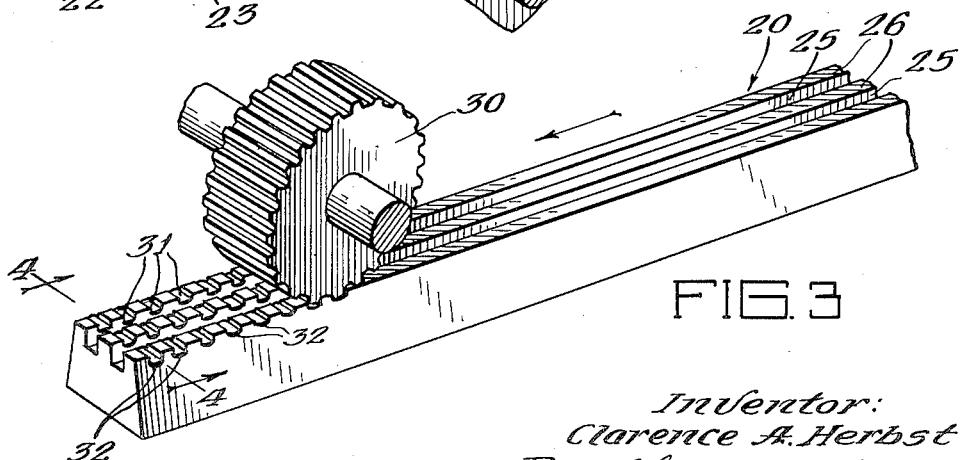
Inventor:
Clarence A. Herbst
By: Schroeder, Hofgren,
Brady & Wegner
Attorneys:

Dec. 4, 1962 C. A. HERBST 3,066,387
METHOD OF MAKING COMMUTATORS
Filed June 20, 1958 2 Sheets-Sheet 2
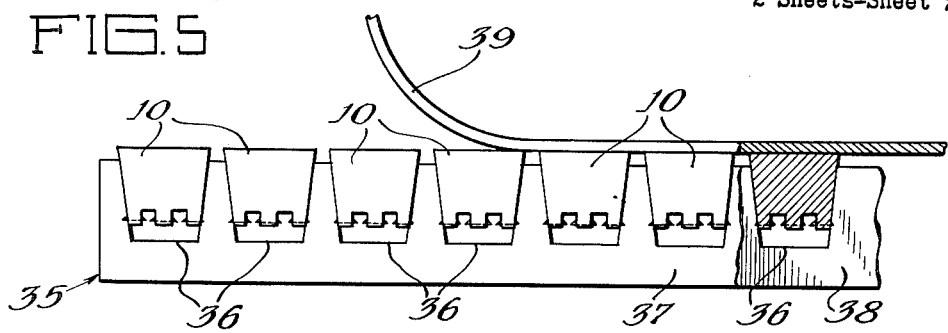
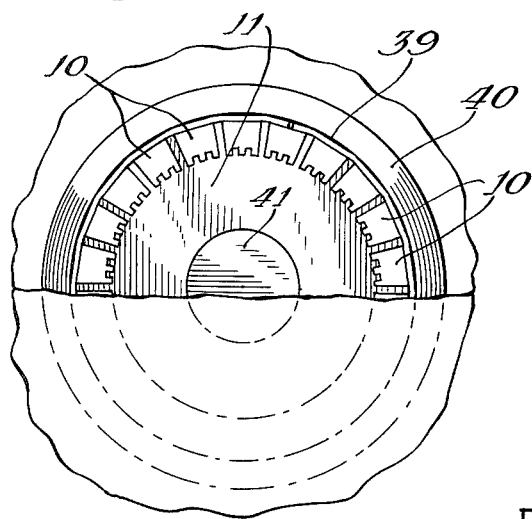
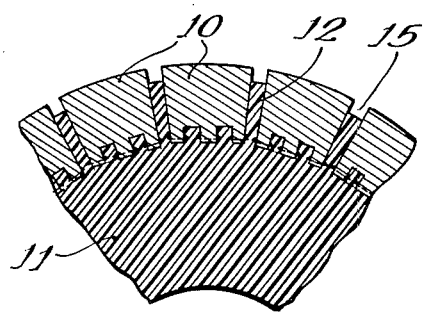
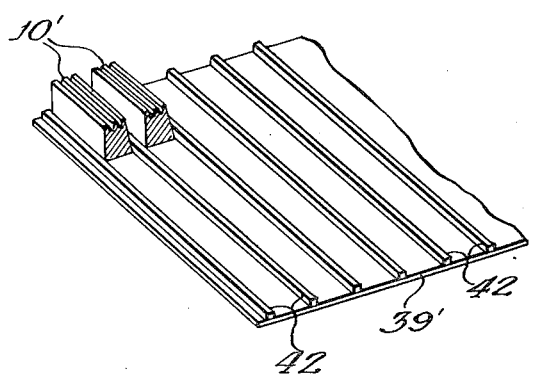
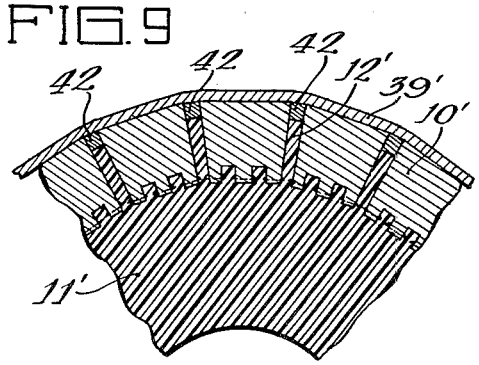
Inventor:
Clarence A. Herbst
By Schroeder, Hofgren,
Brady & Wegner
Attorneys

United States Patent Office 3,066,387
Patented Dec. 4, 1962

3,066,387
METHOD OF MAKING COMMUTATORS
Clarence A. Herbst, Park Ridge, Ill., assignor to Resinoid Engineering Corporation, a corporation of Illinois
Filed June 20, 1958, Ser. No. 743,245
10 Claims. (Cl. 29—155.54)

This invention relates to commutators, and more particularly to a method of making same.

It is a general object of the invention to provide a new and improved method for more easily and economically manufacturing commutators.

A more specific object is to provide a new and improved method of the type described including the steps of arranging separate commutator bars in spaced parallel relationship, adhering a carrier ribbon to the outer surfaces of the arranged bars, coiling the carrier and bars and placing the same in a mold cavity, and introducing a plastic insulating material into the cavity to fill the spaces between bars to bind them together and form an inner insulating core.

Another object is to provide a new and improved method of the type described in the preceding paragraph including the steps of placing fusible strips on the carrier between commutator bars before molding, and melting out the fusible strips after molding to leave undercuts between adjacent bars at the outer surface of the commutator.

Another object is to provide a method of making commutators which eliminates some of the costly procedures heretofore followed.

Other objects and advantages will be apparent as the description proceeds, taken in connection with the accompanying drawings, in which:

FIG. 1 is a perspective view of a commutator made according to the principles of the present invention;

FIG. 2 is a perspective view illustrating the formation of grooves and ridges in one surface of commutator bar stock;

FIG. 3 is a perspective view illustrating the formation of tangs at the sides of ridges previously formed;

FIG. 4 is an enlarged fragmentary sectional view, taken at about the line 4—4 of FIG. 3, illustrating in detail the shape of the tangs;

FIG. 5 is a side elevational view illustrating an arrangement of individual commutator bars and a carrier therefor;

FIG. 6 is a fragmentary top plan view, partly broken away, illustrating a molding process by which a commutator is made;

FIG. 7 is a fragmentary sectional view illustrating details of a finished commutator;

FIG. 8 is a fragmentary perspective view illustrating an arrangement of commutator bars on a carrier strip with solder strips between commutator bars, according to a modified process of manufacture; and FIG. 9 is a fragmentary sectional view illustrating an unfinished stage in the process of FIG. 8.

While preferred forms of the invention are shown in the drawings and hereinafter described in detail, it is to be understood that the invention is not limited to the particular forms shown. It is contemplated that various changes may be made by those skilled in the art without departing from the spirit and scope of the appended claims.

Commutators for electric machines have been constructed in a variety of sizes and ways. Some of the methods of manufacture have utilized a plurality of separate commutator bars with insulating spacers therebetween, all arranged in a pattern to provide an outer exposed cylindrical surface, and with end clamp rings of insulating material for holding the bars in proper positions. Other methods have included the use of a tubular member to which an insulating core is added, after which the tubular member is severed longitudinally to form separate commutator bars. In most cases, the above noted methods have required that the manufacturer set up tools and machines to make a specific number of bars for the commutator as each bar of necessity had to be provided with means for anchoring it to the core. If a commutator of the same diameter with a different number of bars or a commutator of a different diameter with the same number of bars were desired, this necessitated a complete change of machinery and tooling involving considerable time and expense. I have perfected a method of manufacturing commutators in which the above noted difficulties have been overcome and a more economical procedure provided.

Referring now to FIG. 1, a completed commutator made according to the present invention includes a plurality of separate commutator bars 10 and an insulating core 11 including portions 12 which extend into the spaces between bars 10 for insulating the bars from each other. The core 11 preferably consists of a plastic composition, such as asbestos filled phenolic resins, and is formed by a molding operation which provides a central axial opening 13 through the core. At the outer surface of the commutator, the insulating core material 12 is preferably undercut slightly below the surface of the bars 10 in order to provide a slotted outer periphery as illustrated at 15. This construction is desirable, and necessary in some cases, in order to prevent undesirable collection of powdered brush material on the surface of the insulating material 12 in a manner to bridge the gap between commutator bars and thereby defeat the purpose of the insulating material 12.

A commutator of the type described, used in great quantities in automotive equipment, may be mounted on a suitable shaft positioned in opening 13. In order to connect each of the individual bars with separate conductive wires, the bars may be slotted (not shown) at one end surface angularly toward the periphery of the commutator to thus form a socket to receive a wire end. After the wire ends are positioned, they may be suitably secured to the bars as by dipping the assembly in a hot solder bath.

In a preferred method of making commutators such as that illustrated in FIG. 1, the individual commutator bars 10 are formed from a bar stock such as that illustrated at 20 in FIG. 2 which may be extruded in substantially the form shown in continuous lengths or in indefinite lengths sufficient to provide a large number of individual commutator bars. It will be noted that the bar stock is substantially trapezoidal in cross section, having parallel upper and lower surfaces 21 and 22 of unequal length and non-parallel side surfaces 23 of equal length. The length of the four sides 21, 22 and 23 does not differ greatly, and the cross section of the bar approaches a square, the height and width thus being approximately the same.

After extrusion, the upper narrow surface of the bar stock 20 is treated according to the principles set forth in my Patent 2,658,159, granted November 3, 1953, to provide undercut tangs which insure that the individual commutator bars are securely locked to the molded insulating core so that the bars remain in position during rotation of the commutator at high speeds. Accordingly, the upper surface 21 is first provided with one or more grooves, such as those at 25 in FIG. 2, extending longitudinally of the bar and alternating ridges such as those seen at 26. The alternating ridges and grooves across the width of the bar may be provided in any suitable manner, such as by a cold rolling operation illustrated in FIG. 2 utilizing a pressure or backing roller 27 and a ribbed roller 28 for forming the grooves 25 and ridges 26 as the stock is passed between the two rollers.

After the grooves 25 and the ridges 26 are formed, the upper surface of the bar stock is next subjected to a swaging operation, as by passing the bar beneath a gear-like roller 30 (FIG. 3) which is effective to produce longitudinally spaced transversely extending grooves 31 in the upper surface of each of the ridges 26. The material depressed from the grooves 31 is projected laterally outwardly to form undercut tangs 32 at opposite sides of the ridges. As best seen in the detail view of FIG. 4, at the places where the tangs 32 project into the grooves 25, the grooves take a somewhat dovetailed shape, and the tangs interlock with the core material 11 in the molding operation to securely retain the bars of the core.

It should be noted that the ridges 26, the cross grooves 31 and the tangs 32 are formed substantially throughout the entire surface of the bar which will become the inner surface of individual commutator bars so that the bond between bars and the core is minutely distributed generally over the contacting surface between the core and the individual bar. For example, the number of individual tangs per square inch of surface area may be as high as 400 to 800. The tangs are thus relatively small compared to the entire surface, and each tang contributes to the bonding action between each bar and the core. This concept is defined in the aforesaid patent as a minutely distributed bond.

After the ridges, grooves and tangs are formed in the upper surface of the bar stock, the stock is severed into lengths suitable for individual commutator bars. Next, a predetermined number of such individual bars for forming a particular commutator are then collected and arranged in a predetermined spaced parallel relationship. This arrangement is illustrated in FIG. 5 wherein a plurality of individual bars 10 are positioned in a suitable rack 35 having recesses or pockets 36 for receiving the bars and holding the same in the predetermined spaced reltionship. Such a rack may comprise spaced relatively thin parallel rack plates 37 and 38, each being provided with recesses such as those at 36. The spacing of the recesses 36 in the rack plates is calculated to space the commutator bars in a predetermined spaced relation necessary to form a particular commutator.

In order to facilitate manipulation of the bars and to expedite the molding operation, a flexible carrier strip 39 is next secured to the outer surface of the prearranged commutator bars, the inner grooved and tanged surfaces of the bars having been placed downwardly in the rack. The flexible carrier strip or ribbon 39 may be adhesively secured to the bars in a number of ways. For example, the carrier strip may comprise a very thin brass sheet, a fabric foil or a plastic adhesively coated on one side, a thin metal strip having a thermoreactive pressure sensitive adhesive on one side, or a plastic thermoset film, such as a polyester type.

After the carrier strip is adhered to the commutator bars, a predetermined length of carrier having a predetermined number of commutator bars is removed from the rack and rolled or coiled by hand into a substantially annular shape and dropped into a mold cavity. This step is illustrated in FIG. 6, wherein the mold cavity, preferably annular in shape, has an outer wall 40 and an inner wall 41. The carrier strip 39, whether of fabric, plastic or metal, and particularly if of metal, possesses a certain rigidity, and when dropped in the cavity tends to uncoil against the outer cavity wall, conforming to the shape of the wall. In cases where the carrier does not of course conform to the outer cavity wall when dropped, it may be manually positioned. Preferably, however, the carrier with bars is merely dropped into the cavity, after which the thermosetting insulating plastic material 11 is introduced in a fluid state under molding pressure, and the plastic forces the carrier outwardly against the outer cavity wall and at the same time fills the spaces between adjacent commutator bars and the space around the inner cavity wall 41. This molding operation is possible because the individual bars are approximately square in cross section and of relatively short height as compared to bars of prior art commutators. The latter have been relatively thin and tall due in part to the locking projections that have been provided, and thus extend a substantial distance toward the center of a commutator, prohibiting a molding operation because the bars will not easily remain in position but may tilt to short circuiting positions contacting adjacent commutator bars.

During molding operation, the fluid plastic introduced into the mold cavity penetrates the grooves 31 and 25 in individual commutator bars and reaches behind the tangs 32, embedding the latter in the insulating core material and thereby securely locking the commutator bars to the core.

After the introduction of the core material is completed, the commutator assembly may be removed from the mold cavity with the carrier strip 30 on the outer surface. At this stage the outer surfaces of individual commutator bars are substantially flat as originally formed.

The next step in the manufacture includes the positioning of the assembly in a machine such as a lathe where the assembly is turned or ground down to remove the carrier strip and to round the outer surfaces of the bars, as well as the insulating material 12 between bars, to a cylindrical shape. After this, a portion of the insulating material 12 between bars is removed mechanically, as by machine apparatus suitable for this purpose, to leave gaps or slots as at 15 between the bars at the outer surface of the commutator, thereby providing improved operation as described.

The undercutting operation described, to remove material as at 15, has proved to be an expensive operation in providing commutators suitable for automotive generators due to the fact the core material is extremely hard and tools wear rapidly and require frequent changing, thereby causing undesirable shutdowns of automatic machinery. In some cases the undercutting operation may involve 15–17% of the entire cost, thus representing a substantial expense.

Accordingly, in a preferred form of the invention the need for undercutting has been eliminated. According to the method illustrated in FIGS. 8 and 9, wherein like parts have been designated by primed reference numbers, removable strips or bars 42 are positioned in the spaces between bars before the molding operation for removal after the molding operation to leave gaps as at 15 in a less expensive manner than that described above. As seen in FIG. 8, such strips are adhered to the carrier strip 39', between bars 10'. The strips 42 may be adhered to the carrier after the carrier and commutator bars are removed from the rack illustrated in FIG. 5, or they may be placed on the rack and adhered to the carrier at the time the carrier strip is adhered to the commutator bars. After the assembly is placed in the mold cavity, the removable strips 42 occupy areas which cannot be filled by core material as will be appreciated on viewing FIG. 9. The molding operation is otherwise similar to that previously described.

After removal of the assembly from the mold, it is subjected to a turning operation as previously described to remove the carrier 39', but leaving the strips 42 or portions thereof in position. In the preferred form, the strips 42 comprise a fusible material such as a plastic, or preferably solder, which does not completely melt during the molding operation but which is softened due to the heat of the core material and pressed outwardly by the core material to fit against the carrier between commutator bars. After the carrier is removed as by a turning operation the strips 42 may be melted out. In a preferred form, solder strips are used and these may be rendered fluid on dipping the assembly to solder wire to the individual commutator bars as described in connection with FIG. 1, and flow out into the solder dip tank. A simple brushing operation at this time insures complete removal of all portions of the strips 42, leaving the desired slots as at 15.

It will be understood now that I have provided an improved method of making commutators which may be easily and inexpensively carried out and which enables a high degree of flexibility in changing commutator diameters or the number of commutator bars, or both, without involving expensive alternations in machinery setups. Considerable expense of manufacture is avoided by forming the bars initially as specified since waste material is substantially avoided and the bars formed continuously. Additional savings results from the assembly of the bars into the mold cavity, each bar being held in proper position substantially automatically and forced to such correct position when the core material is introduced. A further savings is effected when the commutator is made as herein specified to avoid the necessity of undercutting the individual bars to remove the insulating core between adjacent bars.

I claim:

1. A method of making a commutator or similar article by molding an insulating core within an anuular series of conductive bars and between adjacent bars, comprising, the steps of: arranging the bars in spaced parallel relationship, adhering to the outer surfaces of the spaced bars a carrier strip of a length substantially equal to the circumference of the article to be made, rolling the carrier strip with bars thereon generally into ring form and positioning the same in a mold cavity having an outer cylindrical wall of a diameter substantially equal to the diameter of the article to be made, with the ends of the strip closely adjacent and unlapped, and with unoccupied spaces between adjacent bars, and introducing insulating material in plastic form into the cavity to force the carrier strip against the outer cavity wall and to fill the spaces between bars and form an inner insulating core.

2. The method of claim 1, including the step of: removing the carrier strip to expose outer surfaces of individual conductive bars and insulating material therebetween.

3. The method defined in claim 1, including the steps of: cooling the assembly, turning the outer surface of the cooled assembly to remove the carrier strip and to expose and round outer surfaces of individual conductive bars and insulating material therebetween.

4. The method defined in claim 3, including the step of: removing insulating material between bars to a predetermined depth from the outer surface.

5. The method defined in claim 1, including the steps of: applying removable strips of material to the carrier strip between bars before molding the core, and removing the removable strips after molding the core to provide slots between bars at the outer surface of the commutator.

6. The method defined in claim 1, including the steps of: adhering thin strips of fusible material to the carrier strip between bars before molding the core, and applying heat of the assembly after molding the core to melt out the fusible strips.

7. A method of making a commutator or similar article by molding an insulating core within an annular series of conductive bars and between adjacent bars, each having a radial height approximately equal its circumferential width, with insulating material between adjacent bars, comprising the steps of: arranging the bars in spaced parallel relationship, adhering a carrier strip to the outer surfaces of the spaced bars, rolling the carrier strip with bars thereon generally into ring form and placing the same in a mold cavity having an outer cylindrical wall of a diameter substantially equal to the diameter of the article to be made, with the carrier strip against said wall, with its ends unjoined and with unoccupied spaces between adjacent bars, and introducing insulating material in plastic form into the cavity to fill the spaces between bars and form an inner insulating core.

8. A method of making a commutator or similar article by molding an insulating core within an annular series of conductive bars and between adjacent bars, comprising the steps of: arranging the bars in spaced parallel relationship, adhering to the outer surfaces of the spaced bars a resilient carrier strip of a length substantially equal to the circumference of the article to be molded, rolling the carrier strip with bars thereon generally into annular form and positioning and releasing the same in an annular mold cavity having an outer diameter substantially equal to the diameter of the article to be molded so that the strip springs radially outwardly toward the outer cavity wall, with unoccupied spaces between adjacent bars, and introducing a plastic insulating material into the cavity to fill the spaces between bars and around the inner cavity wall.

9. A method of making a commutator or similar article by molding an insulating core within an annular series of conductive bars and between adjacent bars, comprising, the steps of: longitudinally grooving one surface of a length of a bar stock to form alternate ridges and grooves across said surface, forming longitudinally spaced, laterally projecting undercut tangs at the sides of the ridges, severing individual commutator bars from the length of stock, arranging the bars in spaced parallel relationship with the ridged surfaces in a common plane, adhering to the opposite surfaces of the spaced bars, a resilient carrier strip of a length substantially equal to the circumference of the article to be molded, rolling the carrier strip with the bars thereon generally into a ring shape and positioning and releasing the same in an annular mold cavity having an outer diameter substantially equal to the diameter of the article to be molded so that the strip springs radially outwardly toward the outer cavity with unoccupied spaces between adjacent bars, and introducing insulating material in plastic form into the cavity to fill the spaces between the bars and around the inner cavity wall.

10. A method of making a commutator or similar article by molding an insulating core within an annular series of conductive bars and between bars, each having a height approximately equal its width, with insulating material between adjacent bars, comprising the steps of: arranging the bars in spaced parallel relationship, adhering to the outer surfaces of the spaced bars a resilient carrier strip of a length substantially equal to the circumference of the commutator to be molded, rolling the carrier strip with bars thereon generally into annular form with the ends thereof free and positioning and releasing the same in an annular mold cavity so that the strip springs radially outwardly against the outer cavity wall, with unoccupied spaces between adjacent bars, and introducing thermosetting insulating material into the cavity to fill the spaces between bars and around the inner cavity wall.

References Cited in the file of this patent

UNITED STATES PATENTS

| 1,280,892 | Steenstrup | Oct. 8, 1918 |
| 1,325,325 | Janke | Dec. 16, 1919 |
| 1,845,115 | Apple | Feb. 16, 1932 |
| 1,883,736 | Cotterman | Oct. 18, 1932 |
| 2,641,439 | Williams | June 9, 1953 |
| 2,967,347 | Rhea | Jan. 10, 1961 |

FOREIGN PATENTS

| 953,099 | Germany | Nov. 29, 1956 |